United States Patent
Kanayama et al.

(10) Patent No.: US 7,065,391 B2
(45) Date of Patent: Jun. 20, 2006

(54) COMMUNICATION SYSTEM, COMMUNICATION APPARATUS, AND COMMUNICATION CONTROL METHOD

(75) Inventors: Kenji Kanayama, Kyoto (JP); Toshihiro Suzuki, Kanagawa (JP)

(73) Assignee: Omron Corporation, Kyoto (JP)

( * ) Notice: Subject to any disclaimer, the term of this patent is extended or adjusted under 35 U.S.C. 154(b) by 90 days.

(21) Appl. No.: 10/621,570

(22) Filed: Jul. 18, 2003

(65) Prior Publication Data

US 2004/0018817 A1 Jan. 29, 2004

(30) Foreign Application Priority Data

Jul. 18, 2002 (JP) .............................. 2002-209885

(51) Int. Cl.
H04B 1/38 (2006.01)
(52) U.S. Cl. ...................... 455/574; 455/572; 710/46
(58) Field of Classification Search ................ 455/420, 455/574, 421, 572; 710/46, 15
See application file for complete search history.

(56) References Cited

U.S. PATENT DOCUMENTS

| | | | |
|---|---|---|---|
| 4,625,308 A | 11/1986 | Kim et al. | |
| 4,715,031 A | 12/1987 | Crawford et al. | |
| 4,750,171 A | 6/1988 | Kedar et al. | |
| 5,218,680 A | 6/1993 | Farrell et al. | |
| 5,400,018 A | 3/1995 | Scholl et al. | |
| 5,732,094 A | 3/1998 | Petersen et al. | |
| 5,850,338 A | 12/1998 | Fujishima | |
| 5,907,689 A | 5/1999 | Tavallaei et al. | |
| H001882 H | 10/2000 | Asthana et al. | |
| 6,389,480 B1 | 5/2002 | Kotzur et al. | |
| 6,535,112 B1 | 3/2003 | Rothschink | |
| 6,574,234 B1 | 6/2003 | Myer et al. | |
| 6,640,268 B1 * | 10/2003 | Kumar | 710/46 |
| 2002/0082060 A1 * | 6/2002 | Kang et al. | 455/574 |
| 2003/0037170 A1 | 2/2003 | Zeller et al. | |
| 2003/0148760 A1 * | 8/2003 | Takayanagi | 455/420 |
| 2004/0125821 A1 | 7/2004 | Kuhl | |
| 2004/0181296 A1 | 9/2004 | Muneta et al. | |
| 2004/0210323 A1 | 10/2004 | Muneta et al. | |
| 2004/0210326 A1 | 10/2004 | Muneta et al. | |
| 2004/0210620 A1 | 10/2004 | Muneta et al. | |
| 2004/0215354 A1 | 10/2004 | Nakamura et al. | |
| 2005/0017875 A1 | 1/2005 | Nakayama et al. | |

FOREIGN PATENT DOCUMENTS

| | | |
|---|---|---|
| EP | 0905594 A1 | 3/1999 |
| GB | 2267984 A | 12/1993 |
| GB | 2307068 A | 5/1997 |
| JP | 60-062482 | 4/1985 |
| JP | 03-116395 A | 5/1991 |

(Continued)

Primary Examiner—Sonny Trinh
Assistant Examiner—Phuoc Doan
(74) Attorney, Agent, or Firm—Foley & Lardner LLP

(57) ABSTRACT

A slave can take any of a start state in which the slave can communicate with a master, a communication control state in which at least the slave can receive a start request signal transmitted by the master and makes a transition to the start state upon reception of the start request signal, or a standby state in which power is less consumed than in the start state or the communication control state. The slave further includes a state control section for repeatedly operating so that the slave in the standby state is switched to the communication control state at a predetermined timing and is switched to the standby state when the communication control state continues for a predetermined time period without receiving the start request signal.

20 Claims, 13 Drawing Sheets

FOREIGN PATENT DOCUMENTS

| | | |
|---|---|---|
| JP | 04-045697 A | 2/1992 |
| JP | 05-37980 A | 2/1993 |
| JP | 6-324719 A | 11/1994 |
| JP | 7-282090 A | 10/1995 |
| JP | 08-211792 A | 8/1996 |
| JP | 11-24744 A | 1/1999 |
| JP | 2000-259215 A | 9/2000 |
| JP | 2000-269996 A | 9/2000 |
| JP | 2001-83002 A | 3/2001 |
| JP | 2001-084014 A | 3/2001 |
| JP | 2002-71519 A | 3/2002 |
| JP | 2002-73121 A | 3/2002 |
| WO | WO 00/68660 | 11/2000 |
| WO | WO 02/098065 A1 | 12/2002 |

* cited by examiner

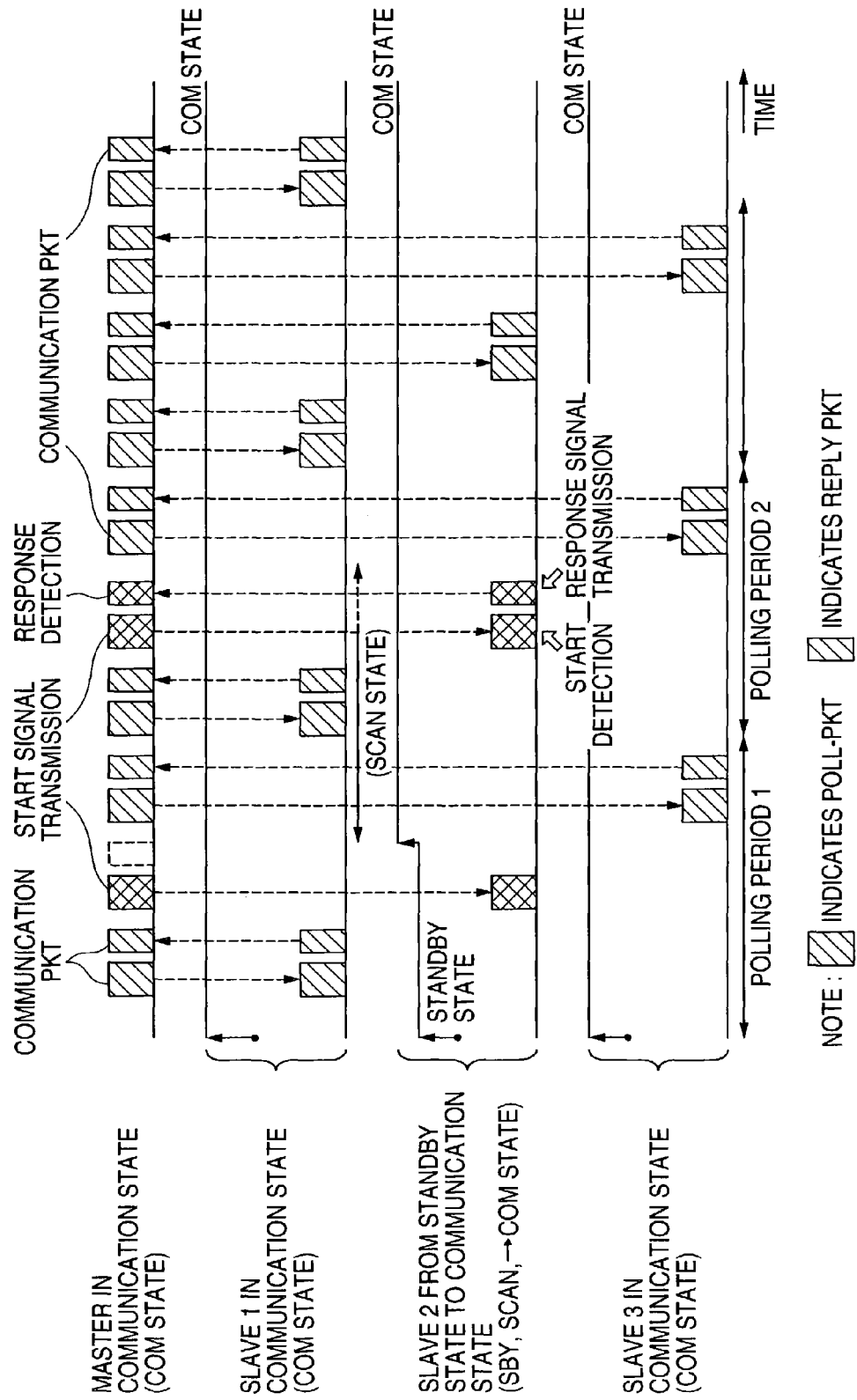

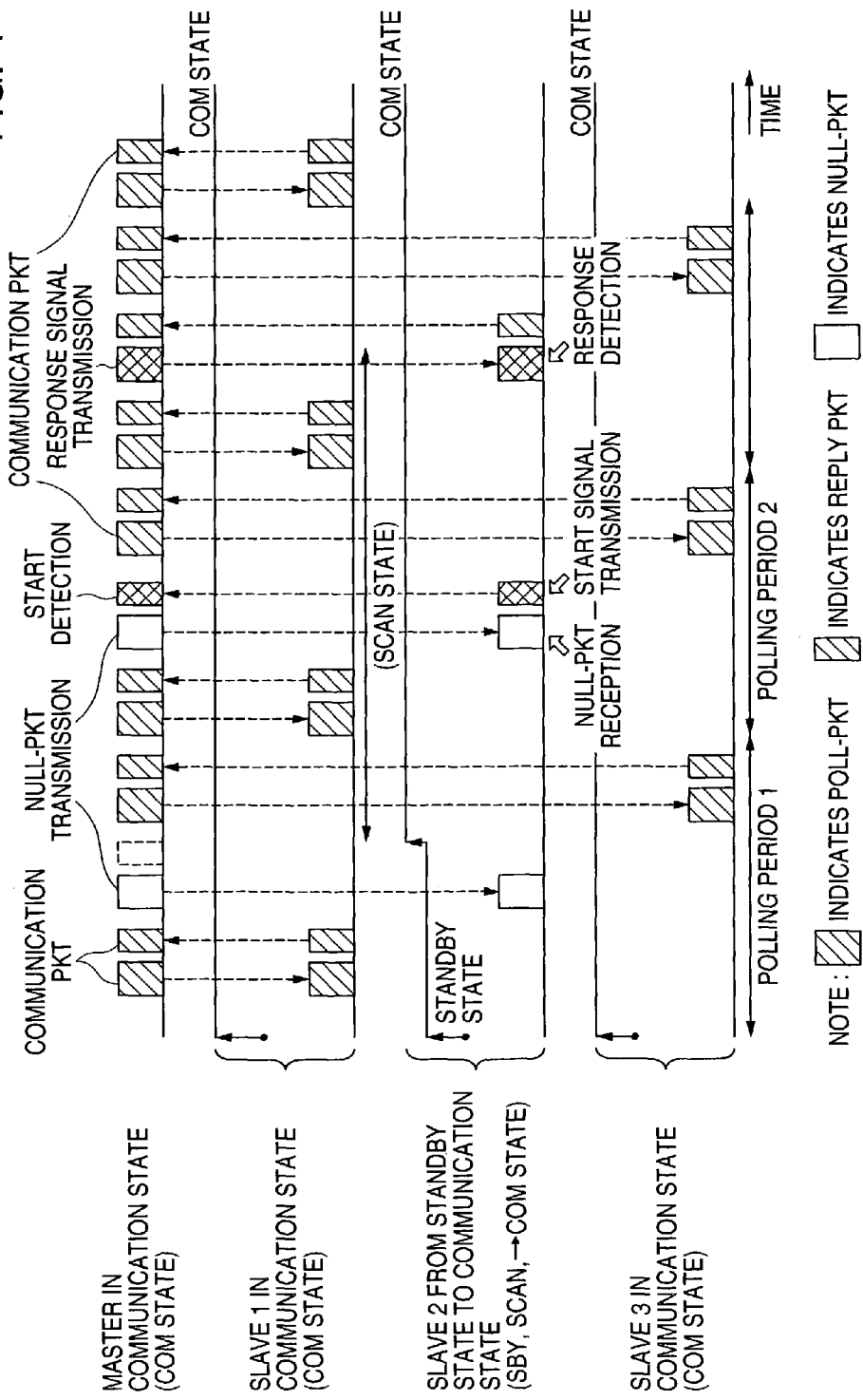

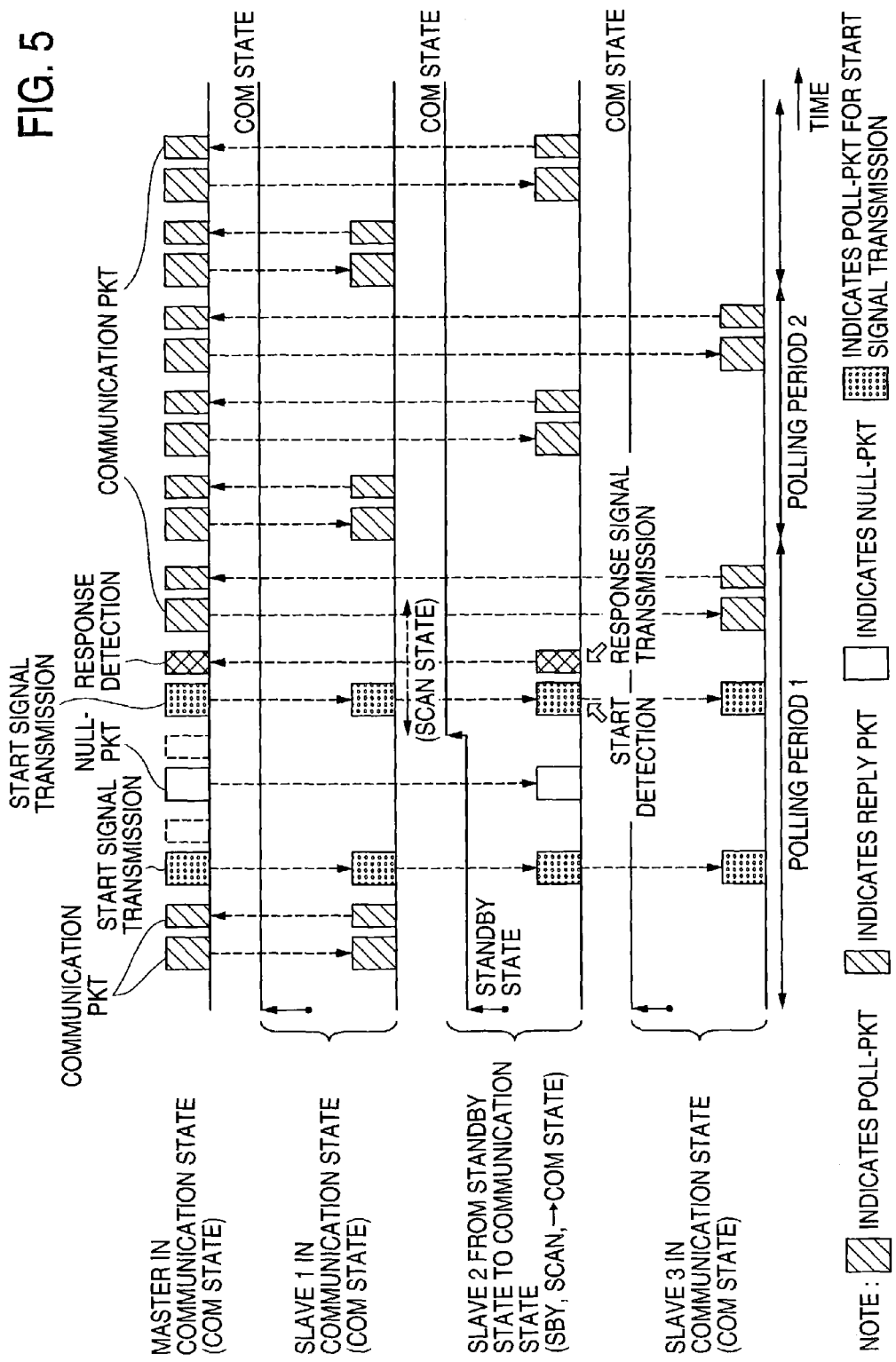

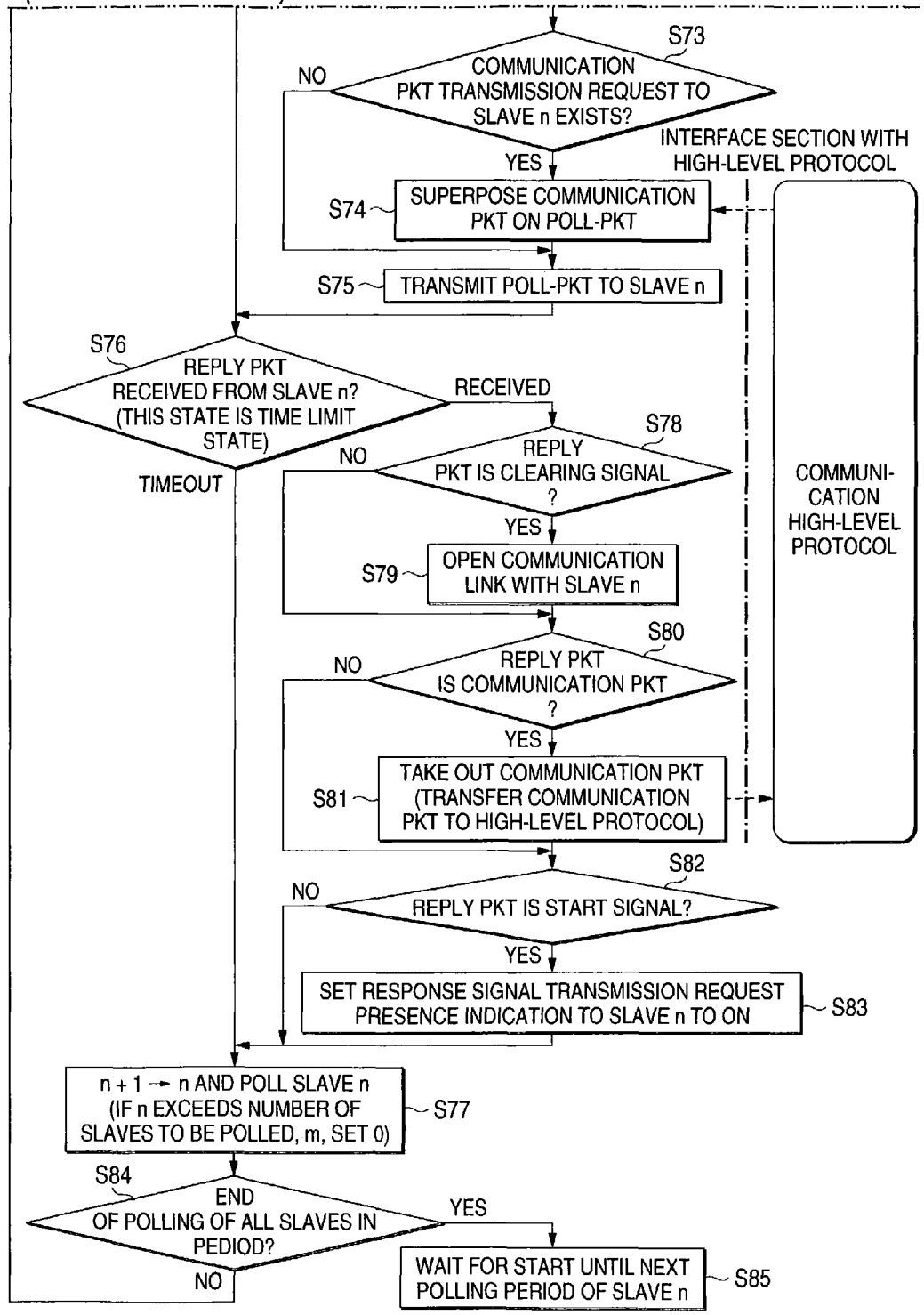

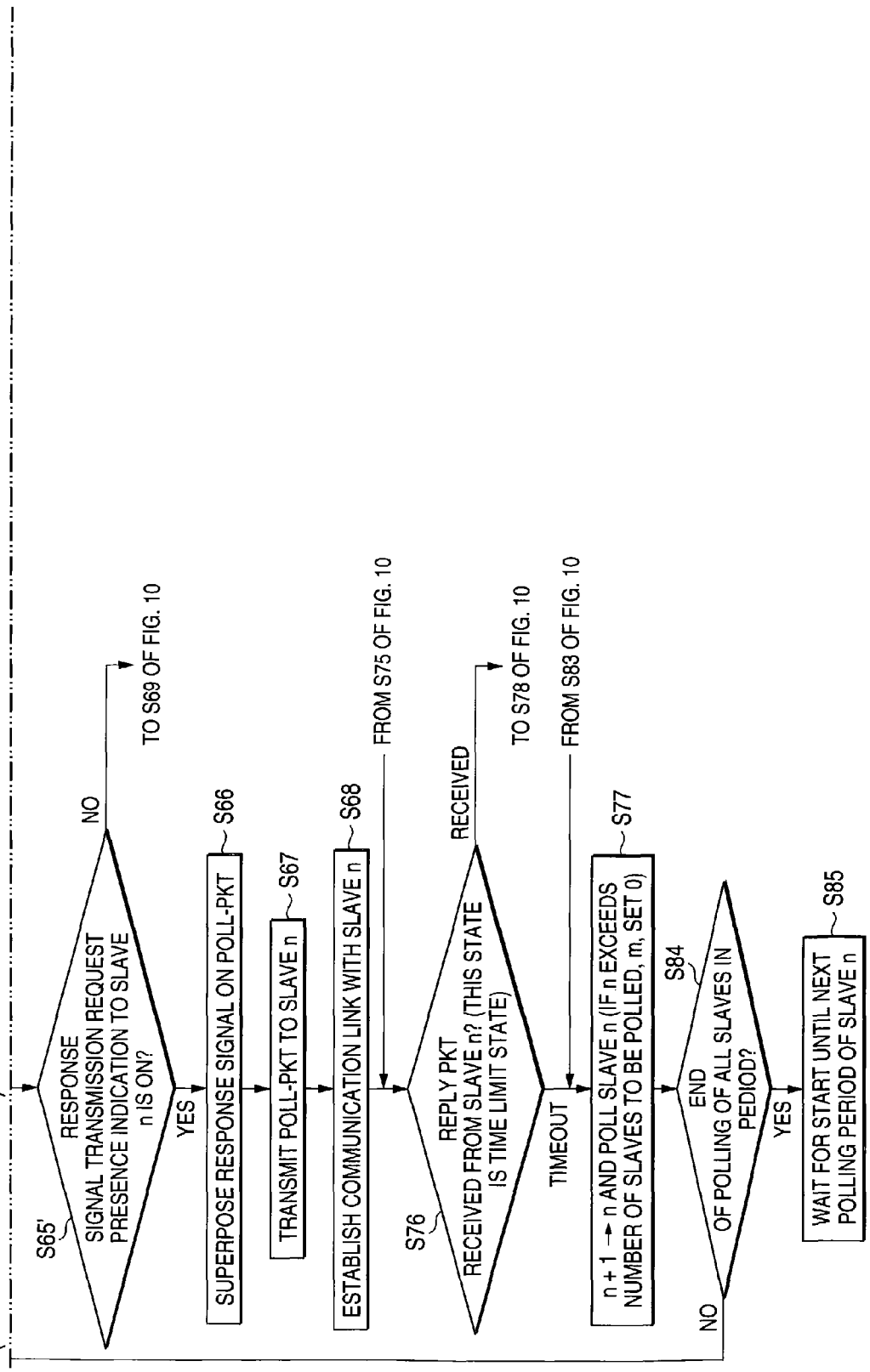

COMMUNICATION SYSTEM, COMMUNICATION APPARATUS, AND COMMUNICATION CONTROL METHOD

BACKGROUND OF THE INVENTION

1. Field of the Invention

This invention relates to a communication system, a communication apparatus, and a communication control method preferably used particularly with various monitoring systems requiring continuous monitoring for many hours.

2. Description of the Related Art

In recent years, development of open wireless communication systems, such as a radio LAN and Bluetooth (registered trademark), has been brisk. In the communication systems, fully wireless slaves are provided.

However, the communication systems assume that the use time of a slave at a time is short (about several hours); while the slave is used, it consumes power of about 10 mA if the slave is not in communications. Therefore, the communication systems are not fitted for applications where the slave is used continuously for along time, for example, the monitoring system field requiring long-hour monitoring.

On the other hand, a radio communication system for a monitoring system has been provided as an individual system (closed wireless communication system). Some attempt has been made to provide a fully wireless slave, but power consumption causes a bottle neck in realizing a fully wireless slave; a system is only realized wherein the communication start direction is one way, namely, only a communication start request sent from a slave to a master is enabled.

However, to advance the function of a monitoring system in the future, it will become very important to make it possible to establish communications between a slave and a master when either the slave or the master makes a communication start request at any time. That is, the system wherein only a communication start request in one way is enabled as described above will block advancing the function of a monitoring system in the future; this is a problem.

SUMMARY OF THE INVENTION

It is an object of the invention to provide a communication system that can start a slave in response to a start request made by a master while decreasing power consumption in the slave, a communication apparatus as the slave used with the communication system, and a communication control method.

According to a first aspect of the present invention, there is provided a communication system comprising a master and a slave that can communicate with each other, the master including a first communication section for transmitting a start request signal to the slave, the slave including a second communication section for receiving the start request signal transmitted by the master. The slave can take any of a start state in which the slave can communicate with the master, a communication control state in which at least the slave can receive the start request signal transmitted by the master and makes a transition to the start state upon reception of the start request signal, or a standby state in which power is less consumed than in the start state or the communication control state. The slave further includes a state control section for repeatedly operating so that the slave in the standby state is switched to the communication control state at a predetermined timing and is switched to the standby state when the communication control state continues for a predetermined time period without receiving the start request signal.

In the configuration, the slave can take any of the start state, the communication control state, or the standby state.

The start state is a state in which the slave can communicate with the master. For example, it is a state in which a processing sequence for communications can be executed in such a manner that data is transferred from the master to the slave or from the slave to the master based on a predetermined protocol and the slave or the master to which the data is transferred performs predetermined processing based on the transferred data and makes a response to the master or the slave transferring the data as required.

The communication control state is a state in which at least the slave can receive a start request signal transmitted by the master and makes a transition to the start state upon reception of the start request signal. This means that the communication control state is a state in which the slave monitors a start request sent from the master and makes a transition to the start state upon reception of the start request.

The standby state in which power is less consumed than in the start state or the communication control state. For example, it is a state in which power supply to the second communication section, a member for controlling communications in the second communication section, etc., is stopped and power is used almost only as power required for control of the state control section described later.

The slave includes the state control section. The state control section switches the slave in the standby state to the communication control state at a predetermined timing. When the communication control state continues for a predetermined time period without receiving the start request signal, the state control section switches the slave to the standby state. Further, the state control section switches the slave to the communication control state and after the expiration of the predetermined time period, switches the slave to the standby state. The state control section repeats this operation sequence, for example, periodically.

Accordingly, when communications between the slave and the master are not conducted, basically the slave can be placed in the standby mode for decreasing power consumption. The slave, which is in the standby state, is switched to the communication control state, for example, in a predetermined period under the control of the state control section and can monitor a start request sent from the master. Thus, if it becomes necessary for the master to communicate with the slave, the master can also transmit a start request signal at an independent timing of the slave for causing the slave to switch to the start state for conducting communications therebetween.

Therefore, according to the described configuration, the communication system that can start the slave in response to a start request made by the master while decreasing power consumption in the slave can be provided.

As the communication system according to a second aspect of the present invention, in the communication system of the first aspect of the present invention, communications between the master and the slave may be radio communications, the first communication section may transmit the start request signal by radio communications, and the second communication section may receive the start request signal by radio communications.

In the described configuration, communications between the master and the slave are radio communications, so that the master and the slave need not be connected by a communication wire. Since the communication system can decrease power consumption in the slave as described above, if a power supply line is not connected to the slave and the slave is driven by a battery, the slave can be operated for many hours.

Therefore, a communication system wherein a fully wireless slave to which neither a communication line nor a power supply line is connected can be operated can be provided.

As the communication system according to a third aspect of the present invention, the communication system of the first or second aspect of the present invention may include a plurality of the slaves, wherein the master may switch assignment time periods of communications with the slaves in order, thereby communicating with the slaves, and when the master transmits the start request signal, the master may transmit the start request signal in the assignment time period of communications with the slave to which the start request signal is transmitted.

In the described configuration, the master switches the assignment time periods of communications with the slaves in order, thereby communicating with the slaves as in polling processing started by the master, for example. The master can transmit the start request signal in the assignment time period of communications with the target slave as a part of polling processing, for example.

As the communication system according to a fourth aspect of the present invention, the communication system of the first or second aspect of the present invention may include a plurality of the slaves, wherein the master may switch assignment time periods of communications with the slaves in order, thereby communicating with the slaves, and when the master transmits the start request signal, the master may transmit the start request signal using a time period between the assignment time periods of communications with the slaves.

In the above-described configuration wherein the start request signal is transmitted in the assignment time period of communications with the slave to which the start request signal is transmitted, as the number of slaves grows, the start request signal transmission timing interval is enlarged inevitably. For the salve to promptly receive the start request signal transmitted at large intervals, it becomes necessary to set long the time period of the communication control state in the slave. This results in a reduction in the power consumption decrease effect in the slave.

Then, in the configuration, the master transmits the start request signal using the time period between the assignment time periods of communications with the slaves. Accordingly, if the number of slaves grows, enlarging of the start request signal transmission timing interval can be suppressed. Consequently, while the time period of the communication control state in the slave is set to a shorter time period, the slave can receive the start request signal promptly and can respond to a start request from the mater promptly.

As the communication system according to a fifth aspect of the present invention, in the communication system of the fourth aspect of the present invention, the start request signal may be a signal that can cause two or more slaves to make a transition from the communication control state to the start state.

In the described configuration, when the master causes the two or more slaves to make a transition to the start state, it can cause the two or more slaves to make a transition to the start state by a common start request signal.

As the communication system according a sixth aspect of the present invention, in the communication system of the fourth or fifth aspect of the present invention, preferably the time period between the state control section of each slave switching the slave to the communication control state and then switching the slave to the standby state is a time period that can include one of assignment time periods to the slaves in the master and the time required for the master to transmit the start request signal.

In the described configuration, when the slave makes a transition to the communication control state, if the master is in the assignment time period with each slave, the slave is still in the communication control state when the assignment time period terminates and a start signal is transmitted. Therefore, failing to receive a start request signal in the slave can be circumvented and the slave can be started reliably in response to a start request made by the master.

As the communication system according to a seventh aspect of the present invention, in the communication system of the fourth or fifth aspect of the present invention, when the master transmits the start request signal, preferably the master repeatedly transmits the start request signal for a longer time than the time required until, after the state control section of one of the slaves switches the slave to the communication control state, the state control section switches the slave to the standby state and further to the communication control state.

In the described configuration, when the slave makes a transition to the communication control state first after the master starts to transmit the start request signal, the master still repeats transmission of the start request signal. Accordingly, when the slave makes a transition to the communication control state first after the master starts to transmit the start request signal, it is made possible for the slave to make a transition to the start state. Therefore, if the master makes a start request, it is made possible to cause the slave to make a transition to the start state as quickly as possible.

According to the invention according to an eight aspect of the present invention, there is provided a communication apparatus as a slave that can communicate with a master, including a communication section, when the master transmits a start request signal to the communication apparatus, for receiving the start request signal. The communication apparatus can take any of a start state in which the communication apparatus can communicate with the master, a communication control state in which at least the communication apparatus can receive the start request signal transmitted by the master and makes a transition to the start state upon reception of the start request signal, or a standby state in which power is less consumed than in the start state or the communication control state. The communication apparatus further includes a state control section for repeatedly operating so that the communication apparatus in the standby state is switched to the communication control state at a predetermined timing and is switched to the standby state when the communication control state continues for a predetermined time period without receiving the start request signal. The communication section may receive the start request signal by radio communications.

The communication apparatus can be used as the slave in the communication system, so that the communication system that can start the slave in response to a start request made by the master while decreasing power consumption in the slave can be provided.

According to the present invention of a ninth aspect of the present invention, there is provided a communication control method in a slave that can communicate with a master, the method comprising making the slave a start state in which the slave can communicate with the master, making the slave a communication control state in which at least the slave can receive a start request signal transmitted by the master and makes a transition to the start state upon reception of the start request signal, making the slave a standby state in which power is less consumed than in the start state or the communication control state, and performing repeatedly an operation of switching from the standby state to the communication control state at a predetermined timing and switching to the standby state when the communication control state continues for a predetermined time period without receiving the start request signal. The slave may receive the start request signal by radio communications.

The communication control method can be used as control of the slave in the communication system, so that the communication system that can start the slave in response to a start request made by the master while decreasing power consumption in the slave can be provided.

BRIEF DESCRIPTION OF THE DRAWINGS

FIG. 3 is a timing chart showing one packet transmission/reception state in communications between the master and the slave;

FIG. 4 is a timing chart showing another packet transmission/reception state in communications between the master and the slave;

FIG. 5 is a timing chart showing still another packet transmission/reception state in communications between the master and the slave;

DETAILED DESCRIPTION OF THE INVENTION

Referring now to the accompanying drawings (FIGS. 1 to 11), there is shown one preferred embodiment of the invention.

(General Configuration)

Figure 1:
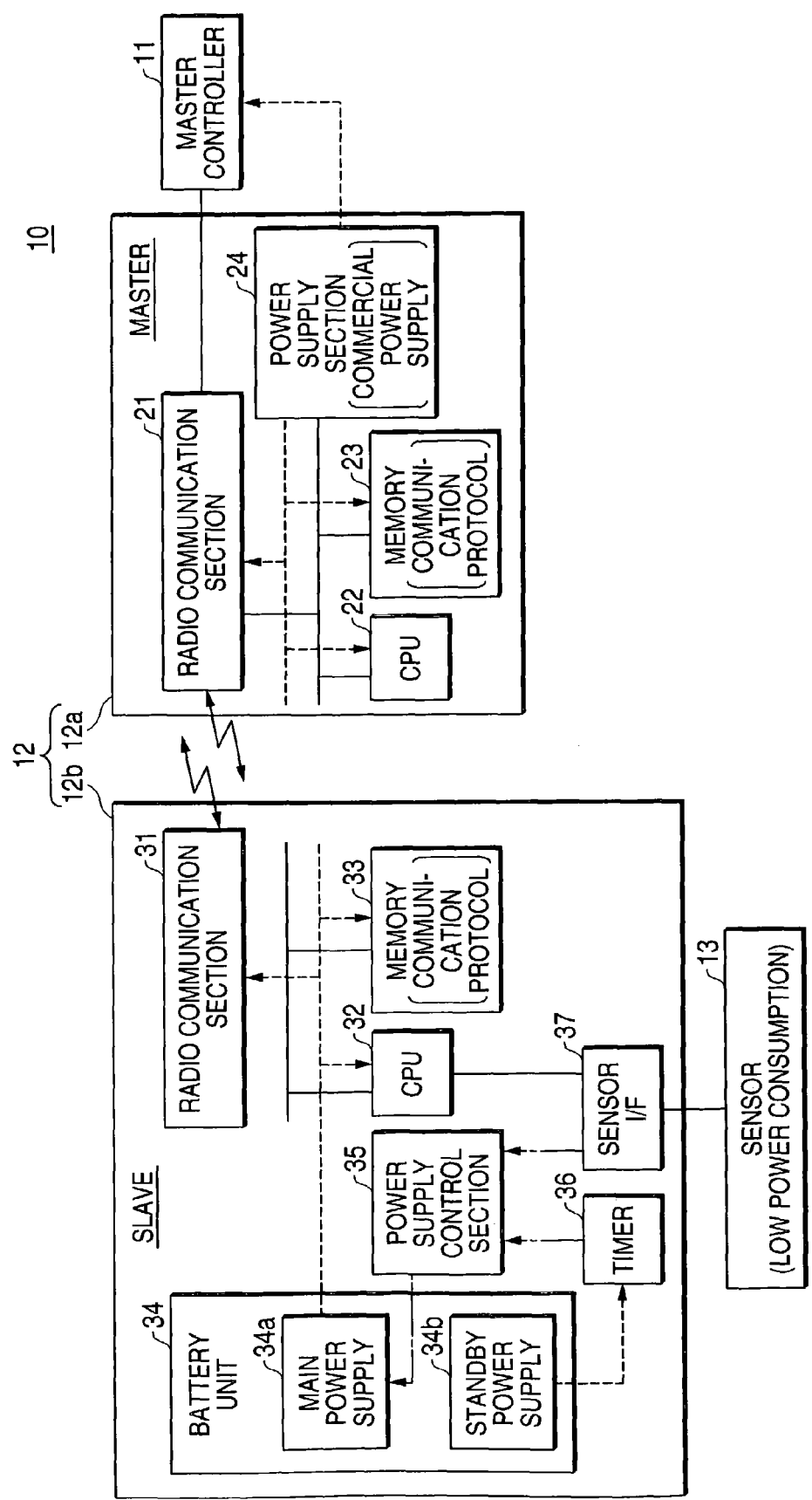
FIG. 1 is a block diagram showing a general configuration of a monitoring system using a communication system in one embodiment of the invention.

FIG. 1 shows a general configuration of a monitoring system 10 using a fully wireless communication system of on-demand connection type (communication system) of the embodiment. The monitoring system 10 includes a master controller 11, a communication system 12, and a sensor 13. The communication system 12 includes a master 12a and a slave 12b. The master controller 11 is connected to the master 12a, the sensor 13 is connected to the slave 12b, and radio communications are conducted between the master 12a and the slave 12b.

The monitoring system 10 is an example of a system using the communication system 12 and the communication system of the invention can also be applied to other systems.

FIG. 1 shows only a single slave 12a and a single sensor 13, but it is assumed that the monitoring system 10 includes a plurality of slaves 12b and sensors 13 for a pair of the master controller 11 and the master 12a. The numbers of the slaves 12b and the sensors 13 may be each one.

In FIG. 1, the dashed line indicates a feeder for supplying power, the alternate long and short dash line indicates a feed start line, and the solid line indicates a circuit-to-circuit connection line (bus, etc.,).

The monitoring system 10 monitors an anomaly by the sensor 13. When the sensor 13 detects an anomaly the monitoring system 10 reports occurrence of the anomaly to the master controller 11 via the slave 12b and the master 12a. The monitoring system 10 sends a control command from the master controller 11 via the master 12a and the slave 12b to the sensor 13.

The master 12a includes a radio communication section 21 (first communication section), a CPU (central processing unit) 22, memory 23, and a power supply section 24.

The radio communication section 21 transmits and receives a packet in radio communications with the slave 12b and also transmits a start signal to the slave 12b as described later. The CPU 22 controls communications of the radio communication section 21 and controls data transfer to and from the master controller 11, etc. The memory 23 stores data and programs required for processing of the CPU 22; for example, the memory 23 stores a communication protocol used for communications of the radio communication section 21. The power supply section 24 acquires electric power required for the master controller 11 and the master 12a from commercial power supply and supplies the power to the sections. When the communication system 12 operates, the power supply section 24 basically supplies power to the sections at all times.

The slave 12b includes a radio communication section 31 (second communication section), a CPU 32, a battery unit 34 (which may be a storage battery unit), a power supply control section 35, a timer 36, and a sensor I/F (interface) 37.

The radio communication section 31 transmits and receives a packet in radio communications with the master 12a and also receives a start signal from the master 12a. The CPU 32 controls communications of the radio communication section 31 and controls data transfer to and from the sensor 13 through the sensor I/F 37, etc. The memory 33 stores data and programs required for processing of the CPU 32; for example, the memory 33 stores a communication protocol used for communications of the radio communication section 31.

The slave 12b operates with the internal battery unit 34. Therefore, an external feeder is not connected to the slave 12b. Since the slave 12b conducts radio communications with the master 12a, an external communication line is not connected to the slave 12b either. Thus, the slave 12b is fully wireless and the communication system 12 is a fully wireless communication system. The master 12a acquires electric power from commercial power supply and thus has a feeder. In the specification, however, the communication system including the fully wireless slave 12b, namely, the slave 12b to which a feeder, a communication line with the master 12a, and the like are not connected is called "fully wireless communication system."

The battery unit 34 includes a main power supply 34a and a standby power supply 34b. The main power supply 34a supplies power for operating the radio communication section 31, the CPU 32, and the memory 33. The main power supply 34a is turned on and off under the control of the power supply control section 35, thereby supplying and stopping power to the radio communication section 31, the CPU 32, and the memory 33. This means that switching is performed between supplying and stopping power to the radio communication section 31, the CPU 32, and the memory 33 appropriately in response to the operation state of the slave 12b under the control of the power supply control section 35.

The sensor 13 is a power-thrifty sensor containing a unique power supply such as a battery and can operate independently of power supply from the main power supply 34a. The sensor I/F 37 can also operate independently of power supply from the main power supply 34a.

On the other hand, when the slave 12b operates, power from the standby power supply 34b is supplied to the timer 36 at all times. Therefore, the timer 36 always operates regardless of the operation state of the slave 12b unless the slave 12b is in a stop state.

The timer 36 performs count operation to switch the slave 12b from a standby state to a communication control state at a predetermined timing and to switch the slave 12b from the communication control state to the standby state at a predetermined timing as described later. The timer 36 times-out at the predetermined timing and as the timer 36 times-out, it gives a power supply start instruction or a power supply stop instruction to the power supply control section 35.

The sensor I/F 37 functions as an interface with the sensor 13 and when the sensor 13 detects an anomaly, the sensor I/F 37 gives a power supply start instruction to the power supply control section 35 to report the anomaly to the master controller 11.

The power supply control section 35 may be able to turn on/off the main power supply 34 as the user operates an external switch placed on the slave 12b or the sensor 13 (not shown)

(State Transition)

Figure 2:
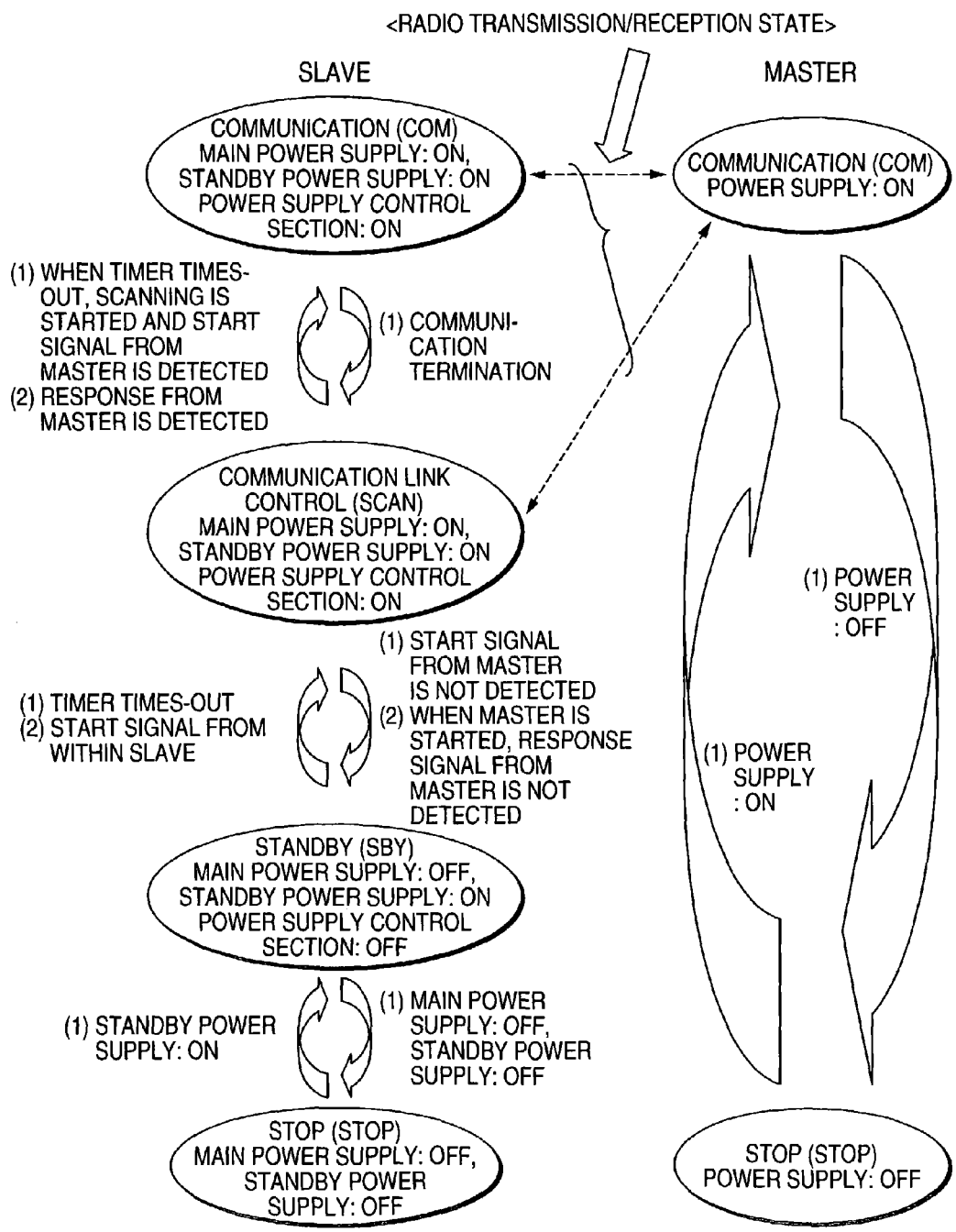
FIG. 2 is a state transition diagram of a master and a slave in the communication system in FIG. 1.

FIG. 2 is a state transition diagram of the master 12a and the slave 12b. The master 12a can take a stop state (STOP state) and a communication state (COM state) The slave 12b can take a stop state (STOP state), a standby state (SBB state) a communication link control state (communication control state, SCAN state), and a communication state (start state, COM state) The states and the correlation between the states will be discussed below:

To begin with, the master 12a will be discussed. The stop state is a state in which the power supply section 24 is off and the master 12a does not function. When the user, etc., turns on the power supply section 24, the master 12a makes a transition to the communication state and enters a state in which the master 12a can communicate with the slave 12b. In the communication state of the master 12a, corresponding to both the communication state and the communication link control state of the slave 12b described later, a polling packet is transmitted to the slave 12b and a reply packet is received from the slave 12b, whereby communications with the slave 12b and communication link control are performed. When the user, etc., turns off the power supply section 24, the master 12a makes a transition to the stop state.

Next, the slave 12b will be discussed. The stop state is a state in which the main power supply 34a and the standby power supply 34b are off and the slave 12b does not function. When the user, etc., turns on the standby power supply 34b, the slave 12b makes a transition to the standby state and the timer 36 is started. In the standby state, the main power supply 34a is off and power supply to the radio communication section 31, the CPU 32, and the memory 33 is stopped. In the description that follows, the power supply control section 35 turning off the main power supply 34a is the power supply control section 35 "off" and the power supply control section 35 turning on the main power supply 34a is the power supply control section 35 "on."

The standby state is a time limit state and when the timer 36 times-out, the power supply control section 35 is turned on and the slave 12b makes a transition to the communication link control state. In the standby state; when-the sensor I/F 37 makes a communication start request (start request), the power supply control section 35 is also turned on and the slave 12b makes a transition to the communication link-control state.

The standby state is a state in which power is less consumed than in the communication state or the communication link control state; it is a state of power consumption of about 200 µA, for example.

The communication link control state is a state in which the slave 12b can communicate with the master 12a. However, the communication link control state differs from the communication state in that it is a time limit state and basically the slave 12b makes a transition to the standby state when the timer 36 times-out or under the control of the CPU 32.

If the slave 12b makes a transition to the communication link control state as the timer 36 times-out in the standby state, when the radio communication section 31 receives a start signal from the slave 12a in the communication link control state, the count operation of the timer 36 is stopped and the time limit state is released and thus the slave 12b makes a transition to the communication state.

If the slave 12b makes a transition to the communication link control state as the sensor I/F 37 makes a communication start request in the standby state, when a start signal is transmitted to the slave 12a and a response to the start signal is detected in the communication link control state, the count operation of the timer 36 is stopped and the time limit state is released and thus the slave 12b makes a transition to the communication state.

Here, the communication link control state is defined as a state in which the slave 12b can communicate with the master 12a as in the communication state. However, the communication link control state need not necessarily be a state in which the slave 12b can completely communicate with the master 12a and may be at least a state in which the slave 12b can receive a start signal transmitted by the master 12a and can make a transition to the communication state upon reception of the start signal.

The communication state is a state in which the slave 12b can communicate with the master 12a. In the communication state unlike the communication link control state, as communication termination processing is performed according to the communication protocol in communications with the master 12a, the slave 12b makes a transition to the communication link control state and opens the communication link with the master 12a. The communication termination processing is based on an instruction from the master 12a or an instruction through a high-level protocol (communication high-level protocol) from the sensor I/F 37. Therefore, the communication state is continued until completion of communications-with the mater 12a.

In the communication state, a communication packet from the master 12a is superposed on a polling packet from the master 12a. A communication packet to the master 12a is transmitted as a reply packet to the polling packet from the master 12a.

As described above, the slave 12b can take any of the communication start (start state) in which the slave 12b can communicate with the master 12a, the communication link control state (communication control state) in which at least the slave 12b can receive a start signal (start request signal) transmitted by the master 12a and makes a transition to the communication state upon reception of the start signal, or the standby state in which power is less consumed than in the communication state or the communication link control state.

The slave 12b can repeatedly operate so that the slave 12b in the standby state is switched to the communication link control state at a predetermined timing and is switched to the standby state when the communication link control state continues for a predetermined time period without receiving a start signal from the master 12a. The repeated operation is executed by the timer 36, the power supply control section 35, and the CPU 32, which make up a state control section.

When the slave 12b and the master 12a do not communicate with each other, basically the slave 12b is in the standby state and power consumption in the slave 12b can be decreased. The slave 12b, which is in the standby state, is switched to the communication link control state in a predetermined period under the control of the state control section and monitors a start signal from the master 12a. Thus, if it becomes necessary for the master 12a to communicate with the slave. 12b, the master 12a can also transmit a start signal at an independent timing of the slave 12b for causing the slave 12b to switch to the communication state for conducting communications therebetween.

The master 12a basically is in the communication state at all times and thus can receive a communication request from the slave 12b at any time.

Therefore, the communication system 12 makes it possible to start the slave 12b upon reception of a communication start request from the master 12a while decreasing power consumption in the slave 12b. That is, the power-thrifty slave 12b that can also be used for long hours with the battery unit 34 while enabling the master 12a and the slave 12b to each make a communication start request can be provided.

(Communication Scheme 1)

FIG. 3 shows the packet transmission/reception state in communications between the master 12a and the slave 12b. It is assumed that the communication system 12 includes slaves 1, 2, and 3 as the slaves 12b and that the master 12a communicates with the slaves 1, 2, and 3 according to polling from the master 12a. The polling period is the period in which the master 12a polls the slaves 1, 2, and 3 in order.

The slaves 1 and 3, which are already in the communication state (COM state), receive a communication packet as a polling packet (POLL-PKT) from the master 12a and transmit each a reply packet to the master 12a.

The slave 2 initially is in the standby state (SBY state) In the standby state, even if a start signal is transmitted by polling from the master 12a, the start signal cannot be detected and a response signal cannot be transmitted either.

However, the slave 2 makes a transition to the communication link control state (SCAN state) at a predetermined timing independent of the master 12a. When the slave 2 is in the communication link control state, if the master 12a transmits a start signal to the slave 2, the slave 2 can detect the start signal and transmits a response signal. Accordingly, the slave 2 makes a transition to the communication state and from the next polling period, the slave 2 receives a communication packet from the master 12a and transmits a response packet.

The slave 2 can remain in the communication link control state only up to $\alpha$ polling periods at the maximum and makes a transition to the standby state when the $\alpha$ polling periods are exceeded. $\alpha$ is an adequate numeral of two or more and is set as an initial value.

The master 12a polls all slaves 1 to 3 regardless of the state of each slave. To poll the slaves, the master 12a transmits a communication packet (communication PKT) to the slave in the communication state and transmits a start signal to the slave in any state other than the communication state upon reception of a communication start request or a null packet (NULL-PKT) upon reception of no communication start request.

When the master 12a polls each slave and does not receive a reply packet (reply PKT) from the slave, the following processing is performed in response to the state of the slave. If a reply packet is not returned within a given time from the polled slave in the communication state, it is determined that the slave is in an abnormal condition of failure, etc.

On the other hand, to transmit a start signal in polling the slave in any state other than the communication state, the start signal is transmitted in two polling periods at the minimum and a response signal as a reply packet is not returned within a given time, it is determined that the slave is in an abnormal condition of failure, etc. To transmit a null packet in polling the slave in any state other than the communication state, if a reply packet is not returned, it is not determined that the slave is in an abnormal condition, and usual processing is continued.

Thus, the master 12a switches the assignment time periods of communications with the slaves 1 to 3 in order, thereby communicating with the slaves 1 to 3 and to transmit a start signal, the master 12a transmits the start signal in the assignment time period of communications with the slave to which the start signal is transmitted. Therefore, the master 12a transmits the start signal in the assignment time period of communications with the target slave as a part of polling processing.

When the slave 12b makes a communication start request, the packet transmission/reception state in communications between the master 12a and the slave 12b becomes as shown in FIG. 4.

For example, if the slave 2 makes a communication start request, the slave 2 receives a null packet sent from the master 12a and transmits a start signal to the master 12a as a response packet. The master 12a transmits a response signal to the start signal to the slave 2 in the next polling period and the slave 2 detects the response signal and accordingly makes a transition from the communication link control state to the communication state.

(Communication Scheme 2)

In the scheme in FIG. 3, the start signal is transmitted from the master 12a to the slave 12b when the master 12a polls the slave 12b. On the other hand, the slave 12b makes a transition from the standby state to the communication link control state in the period independent of the polling period and is polled by the master 12a. Thus, in the scheme in FIG. 3, the start signal from the master 12a is not detected until the next polling period depending on the transition timing of the slave 12b from the standby state to the communication link control state.

This causes a time lag (start signal detection delay) to occur in the slave 12b in detecting a communication start request from the master 12a.

Further, in the scheme in FIG. 3, for the slave 12b to detect the start signal from the master 12a in the next polling period at the latest, the duration of the standby state of the slave 12b needs to be set less than the polling period and the duration of the communication link control state of the slave 12b needs to be set more than the polling period. Therefore, it becomes difficult to make sufficiently small the ratio of the duration of the communication link control state to the duration of the standby state, and the power consumption decrease effect in the slave 12b is somewhat small. Particularly, if the polling period is prolonged with an increase in the number of the slaves 12b and the duration of the standby state is shortened to reduce the start signal detection delay in the slave 12b, the power consumption decrease effect more is reduced.

To more reliably detect the start signal from the master 12a in the next polling period at the latest considering the time required for the slave 12b to make a transition from the standby state to the communication link control state (the time until it is made possible for the slave 12b to actually operate in the communication link control state, arising from the machine operation, the software period, etc.,), it is also considered that the duration of the communication link control state of the slave 12b is set to twice or more the polling period, in which case the power consumption decrease effect furthermore is reduced.

To remedy this point, it is desirable that a scheme shown in FIG. 5 should be adopted. In this scheme, the master 12a transmits a start signal as a polling packet to be transmitted to all slaves at the same time (broadcast polling packet) rather than a polling packet to be transmitted to each slave individually (party specification polling packet). Transmission of the broadcast polling packet is started immediately when the master 12a sends a communication start request to any of the slaves 1 to 3, and the broadcast polling packet is repeatedly transmitted until a response signal from the slave 12b to which the communication start request is sent is acknowledged. Therefore, transmission of the broadcast polling packet is repeated at the maximum for the time resulting from adding a predetermined margin to the duration of the standby state in the slave 12b. This margin is set considering the time required for the slave 12b to make a transition from the standby state to the communication link control state (the time until it is made possible for the slave 12b to actually operate in the communication link control state, arising from the machine operation, the software period, etc.,).

Thus, to transmit the start signal, it is desirable that the master 12a should repeatedly transmit the start signal for a longer time than the time required until, after making a transition to the communication link control state, the slave 12b makes a transition to the standby state and further to the communication link control state. In this case, when the slave 12b makes a transition to the communication link control state first after the master 12a starts to transmit the start signal, the master 12a still repeats transmission of the start signal. Accordingly, when the slave 12b makes a transition to the communication link control state first after the master 12a starts to transmit the start signal, it is made possible for the slave 12b to make a transition to the communication state. Therefore, if the master 12a makes a start request, it is made possible to cause the slave 12b to make a transition to the start state as quickly as possible.

To also transmit a party specification polling packet as a usual communication packet, the master 12a transmits the broadcast polling packet meanwhile between one timing at which the party specification polling packet is transmitted and another timing.

Accordingly, the start signal detection delay in the slave 12b can be decreased. The ratio of the duration of the communication link control state to the duration of the standby state in the slave 12b can be sufficiently reduced, and the power consumption in the slave 12b can be decreased drastically.

Figure 6A:
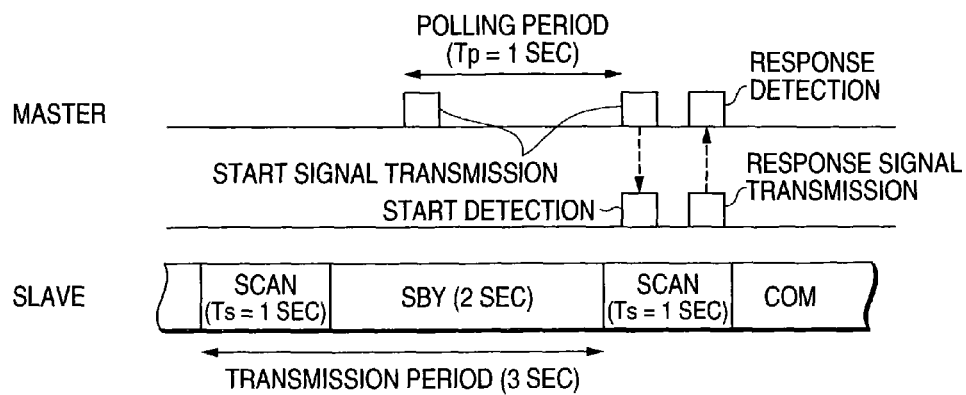
FIGS. 6A and 6B are drawings to making a comparison between the schemes in FIGS. 3 and 5 with respect to the power consumption decrease effect.
Figure 6B:
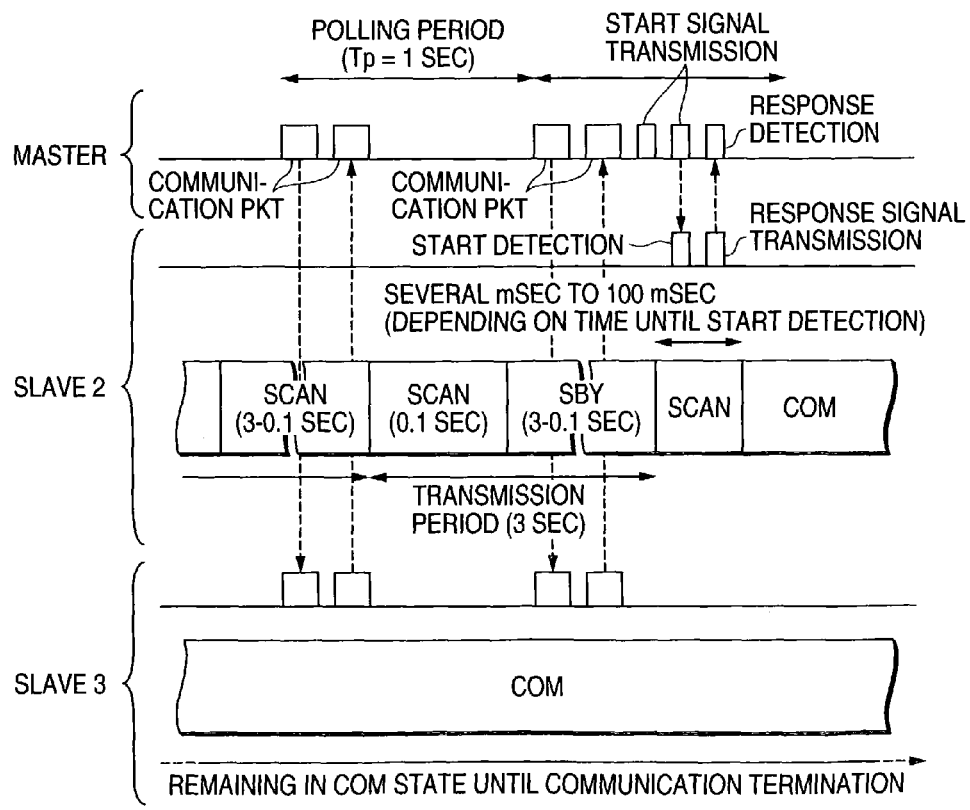

Referring to FIGS. 6A and 6B, a comparison is made between the schemes in FIGS. 3 and 5 with respect to the power consumption decrease effect. Here, it is assumed that the power consumption in the standby state is 200 μA and the power consumption in the communication link control state is 50 mA.

As shown in FIG. 6A, the traffic model in the scheme in FIG. 3 is as follows: Polling period Tp is one second, the period in which a transition from the standby state to the communication link control state occurs in the slave 12b (transition period) is three seconds, and duration of the communication link control state of the slave 12b (worst value of the time required for detecting start signal from the master 12a after transition to the communication link control state (delay time)) Ts is one second.

At this time, the average power consumption of the slave 12b not in the communication state becomes (200 μA×(3−1) sec+50 mA×1 sec)÷3 sec=16.8 mA On the other hand, as shown in FIG. 6B, the traffic model in the scheme in FIG. 5 is as follows: Polling period Tp is one second, the transition period is three seconds, and duration of the communication link control state of the slave 12b Ts is 0.1 sec.

The reason why Ts=0.1 sec is as follows: The duration of the communication link control state of the slave 12b needs to be set to a time for allowing another start signal transmitted from the master 12a to be received if transmission of a party specification polling packet from the master 12a happens to overlap the duration of the communication link control state. Assuming that the packet length of the party specification polling packet is 2 KB (kilobytes) and the transmission speed is 1 Mbps (megabits per second), the time during which a start signal cannot be transmitted as a party specification polling packet is transmitted becomes (2000×8)÷1000000=16 millisec Therefore, as the duration of the communication link control state of the slave 12b Ts is set to 0.1 sec, if transmission of a party specification polling packet from the master 12a happens to overlap the duration of the communication link control state, another start signal transmitted from the master 12a can be received sufficiently. Therefore, Ts is set to 0.1.

Thus, it is desirable that the time period until the slave 12b is switched to the standby state after switched to the communication link control state should be a sufficiently long time period (for example, time period of duration about six times the assignment period) so as to be able to include one assignment time period to transmission of a party specification polling packet in the master 12a and the time required for transmitting a start signal. Accordingly, when the slave 12b makes a transition to the communication link control state, if the master 12a is in the assignment time period to transmission of a party specification polling packet, the slave 12b is still in the communication link control state when the assignment time period terminates and a start signal is transmitted. Therefore, failing to receive a start signal in the slave 12b can be circumvented and the slave 12b can be started immediately in response to a start request made by the master 12a.

At this time, the average power consumption of the slave 12b not in the communication state becomes (200 μA×(3−0.1) sec+50 mA×0.1 sec)÷3 sec=1.86 mA Thus, in the scheme in FIG. 5 in contrast to that in FIG. 3, the duration of the standby state can be set to a sufficiently long time period relative to the time period between the slave 12b making a transition to the communication link control state and making a transition to the standby state. It is desirable that the duration of the standby state should be 20 times or more the time period between the slave 12b making a transition to the communication link control state and making a transition to the standby state. For example, as described above, the time period between the slave 12b making a transition to the communication link control state and making a transition to the standby state is 0.1 sec and the duration of the standby state is 3−0.1=2.9 sec. Accordingly, the ratio of the time period in which the salve 12b is in the communication link control state can be made sufficiently small and the average power consumption of the slave 12b not in the communication state can be decreased drastically.

Thus, the master 12a communicates with the slaves 1 to 3 according to the assignment order of communications with the slaves 1 to 3 and meanwhile when it becomes necessary for the master 12a to transmit a start signal, immediately the master 12a starts to transmit the start signal and repeats start signal transmission. While start signal transmission is repeated, if the transmission timing of a party specification polling packet from the master 12a to the slave 12b happens to overlap the start signal transmission, the party specification polling packet and the start signal are transmitted alternately, whereby the transmission delay of the party specification polling packet can be reduced. Accordingly, if the number of the slaves 12b in the communication state increases and the number of party specification polling packets grows, the transmission delay of the start signal can be reduced. When there is no party specification polling packet transmitted from the master 12a, only the start signal is transmitted repeatedly, in which case the communication line is idle and therefore a problem does not arise.

As described above, in the scheme in FIG. 5, the master 12a switches the assignment time periods of communications with the slaves 1 to 3 in order, thereby communicating with the slaves 1 to 3 and to transmit a start signal, the master 12a transmits the start signal using the time period between the assignment time periods of communications with the slaves 1 to 3. Accordingly, if the number of slaves grows, enlarging of the start signal transmission timing interval can be suppressed. Consequently, while the duration of the communication link control state in the slave is set to a shorter time period, the slave can receive the start signal promptly and can respond to a communication start request from the mater 12a promptly.

The start signal transmitted as a broadcast polling packet may be intended for one slave, but may be intended for two or more slaves so that it can cause the two or more slaves to make a transition to the communication state at the same time. In this case, when the master causes the two or more slaves to make a transition to the start state, it can cause the two or more slaves to make a transition to the start state by a common start request signal. Whether the start signal is intended for one slave or two or more slaves can be determined by a communication protocol between the master 12a and the slaves 12b, for example.

(Operation Flow of Slave)

Figure 7:
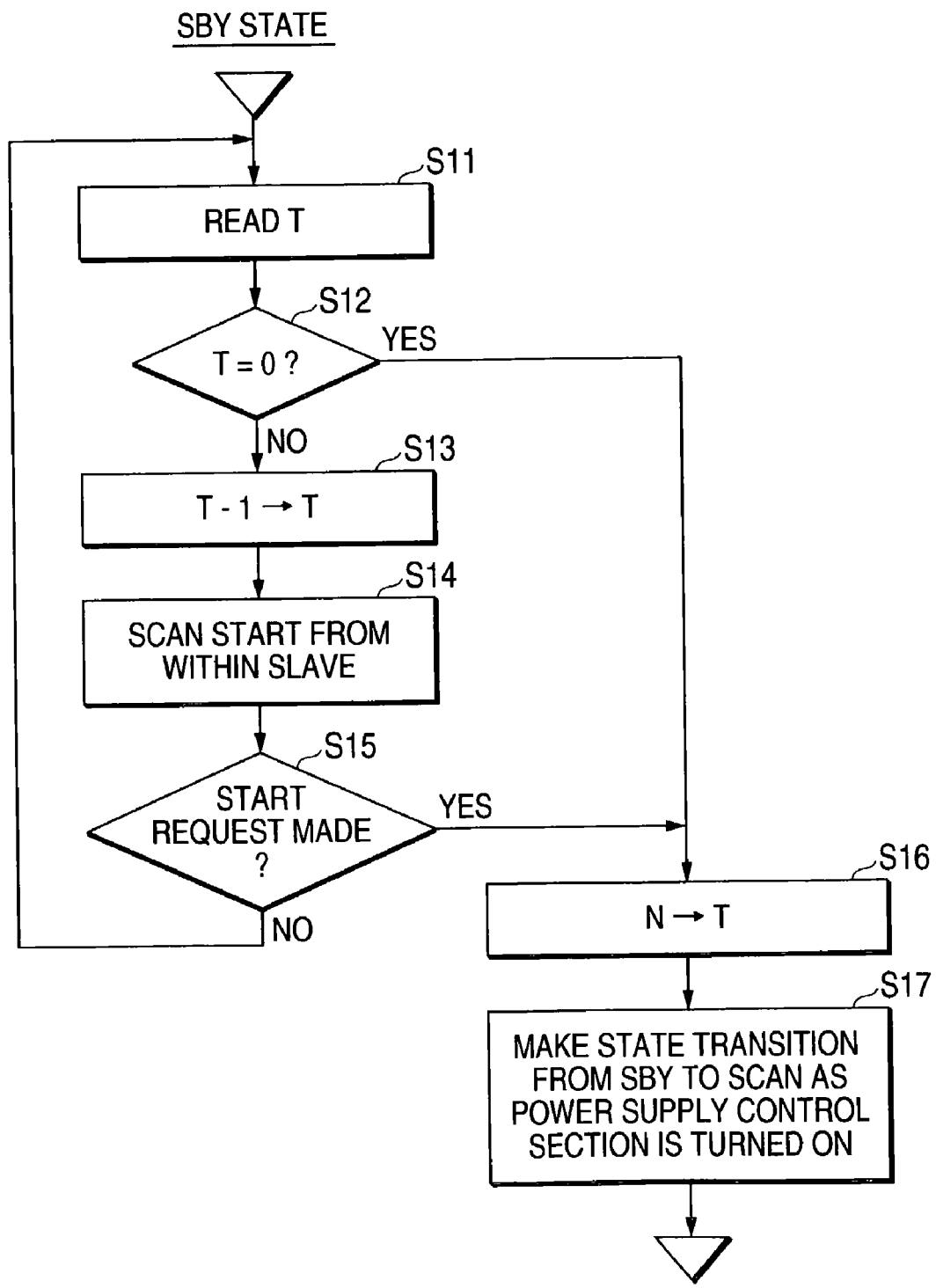
FIG. 7 is a flowchart showing an operation flow of the slave in a standby state in the communication system in FIG. 1.

FIG. 7 shows an operation flow of the slave 12b in the standby state. In the standby state, the timer 36 reads count T (S11) and determines whether or not T is 0 (S12). If T is not 0, the timer 36 decrements the count T (S13) and if the sensor I/F 37 does not make a communication start request (S14, S15), control returns to step S11.

If T is 0 at step S12, namely, a timeout occurs or if the sensor I/F 37 makes a communication start request at step S15, the timer 36 sets the count T to default value N (S16) and turns on the power supply control section 35 and the slave 12b makes a transition to the communication link control state (S17).

Figure 8:
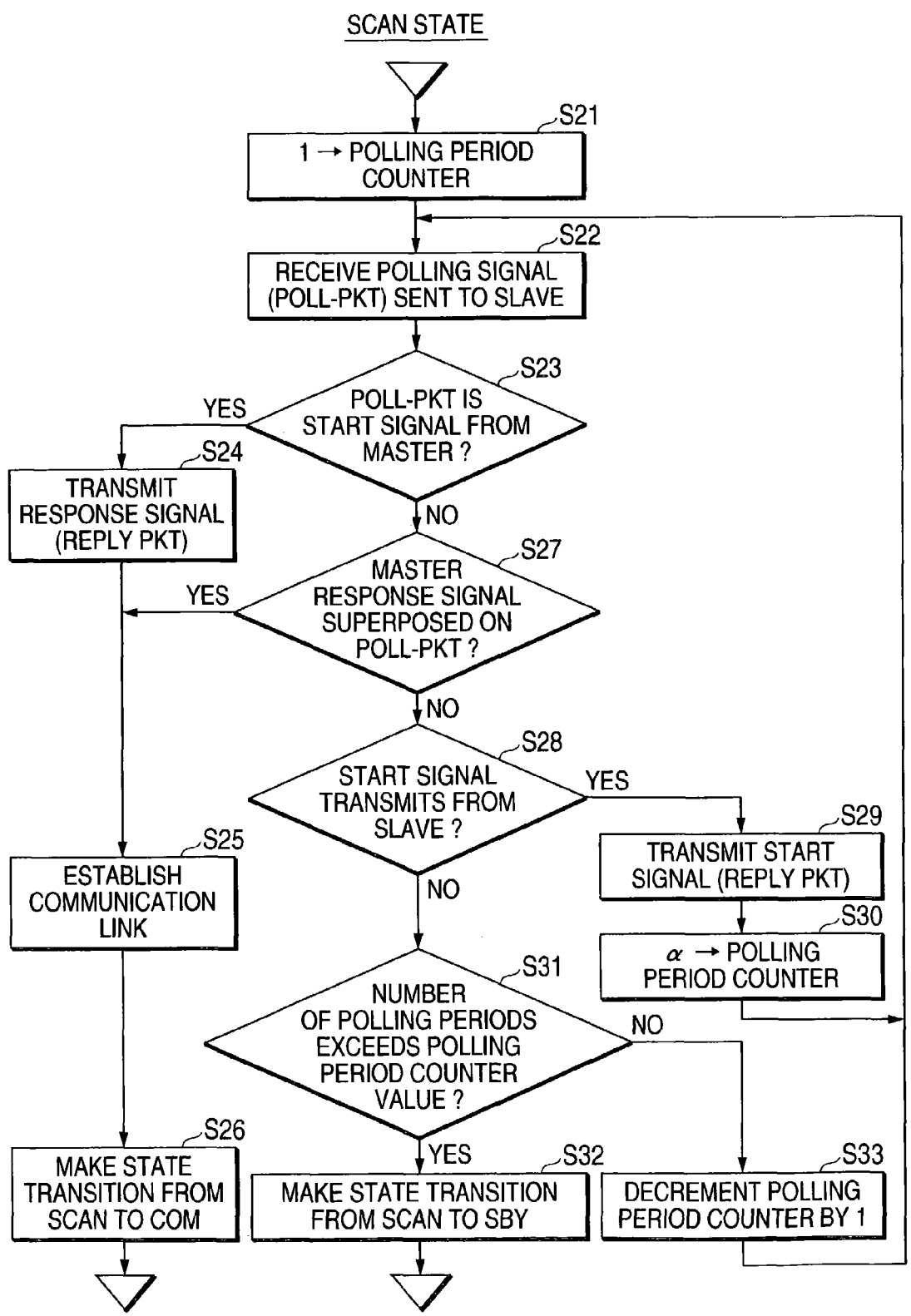
FIG. 8 is a flowchart showing an operation flow of the slave in a communication link control state in the communication system in FIG. 1.

FIG. 8 shows an operation flow of the slave 12b in the communication link control state. Here, it is assumed that to transit a start signal to the master 12a, the slave 12b remains in the communication link control state for the time as long as α polling periods to wait for a response signal from the master 12a after transmitting the start signal. This operation flow basically is executed by the CPU 32 functioning as the state control section for executing a communication link control program stored in the memory 33. Steps 22, 24 and 29 in FIG. 8 are executed by the radio communication section 31.

First, a polling period counter is set to 1 (S21). When the master 12a transmits a polling packet to the slave 12b, the slave 12b receives the polling packet (S22). If the received polling packet is a start signal (S23), the slave 12b transmits a response signal as a reply packet (S24), establishes a communication link with the master 12a (S25), and makes a transition to the communication state (S26).

If the polling packet received at step S22 is a response signal to a start signal transmitted at step S29 described later (S27), the slave 12b establishes a communication link with the master 12a (S25) and makes a transition to the communication state (S26).

If the polling packet received at step S22 is any other than mentioned above such as null packet, etc., and the slave 12b transmits a start signal (S28), the slave 12b transmits a start signal as a reply packet (S29). A communication start request to be sent from the slave 12b is set according to the high-level protocol in the sensor 13 or the slave 12b and is held in the memory 33, etc., until the process arrives at step S28.

The purpose of a step 30 is as follows: When the start signal is transmitted to the master 12a, the slave 12b remains in the communication link control state until reception of a response signal from the master 12a (maximum remaining time=α×polling periods) and upon reception of the response signal, the route for the slave 12b to make a transition to the communication state (steps S27, S25, S26) is set.

If the slave 12b does not transmit a start signal at step S28, whether or not the number of polling periods exceed the polling period counter value is determined (S31). If the number of polling periods exceeds the value, the slave 12b makes a transition from the communication link control state to the standby state (S32); if the number of polling periods does not exceed the value, the polling period counter is decremented (S33) and control returns to step S22.

Figure 9:
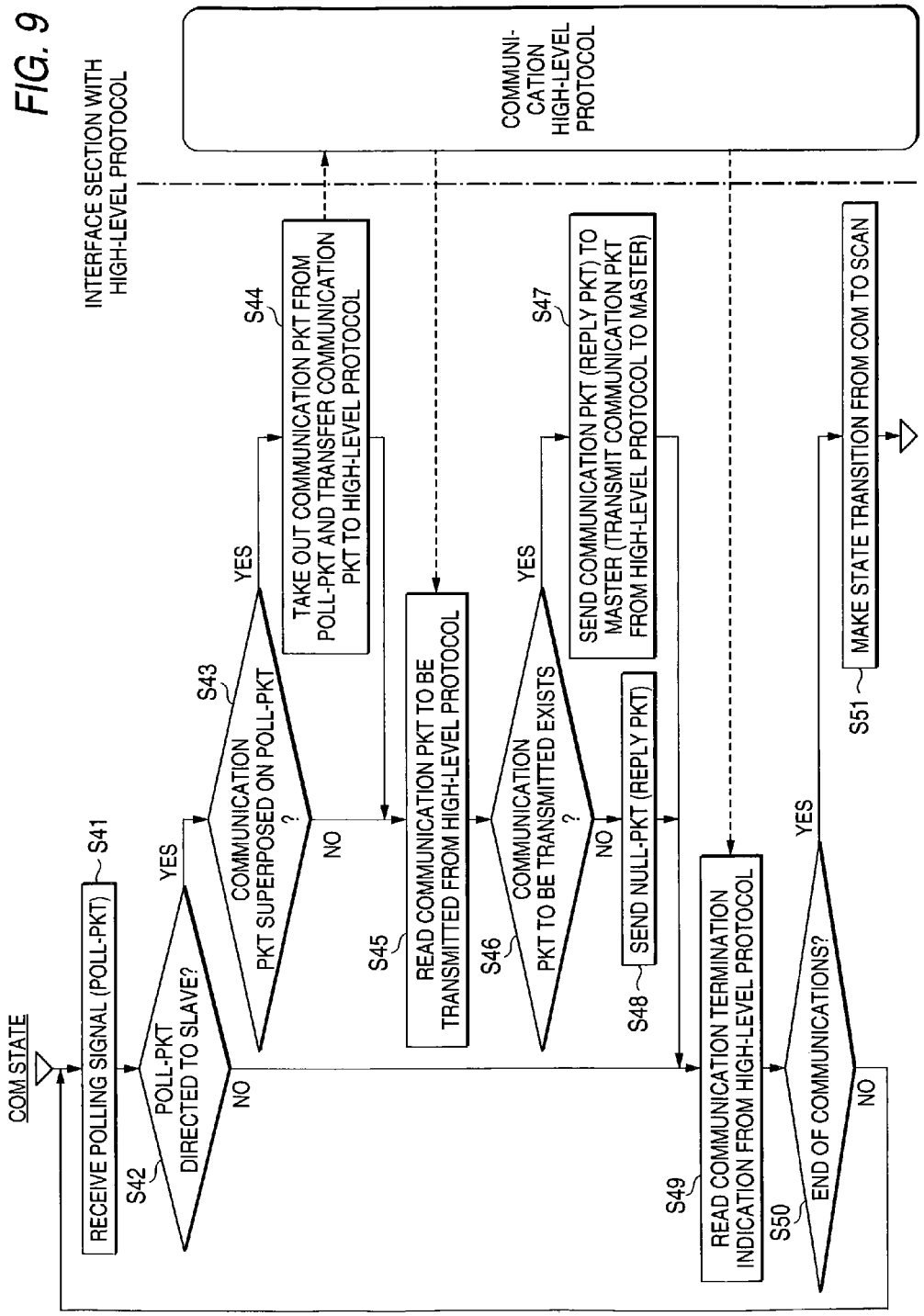
FIG. 9 is a flowchart showing an operation flow of the slave in a communication state in the communication system in FIG. 1.

FIG. 9 shows an operation flow of the slave 12b in the communication state. This operation flow basically is executed by the CPU 32 functioning as the state control section for executing a communication packet transmission/reception program stored in the memory 33. Steps 41, 47, and 48 in FIG. 9 are executed by the radio communication section 31.

Upon reception of a polling packet (S41), the slave 12*b* determines whether or not the polling packet is directed to the slave 12*b*. If the polling packet is directed to the slave 12*b*, whether or not a communication packet from the master 12*a* is superposed on the polling packet is determined (S43). If a communication packet is superposed on the polling packet, the communication packet from the master 12*a* is taken out and is transferred to the high-level protocol (S44). Communication packet to be transmitted is read from the high-level protocol (S45). If the communication packet to be transmitted exists (S46), the communication packet is transmitted as a reply packet to the master 12*a* (S47); if the communication packet to be transmitted does not exist, a null packet is transmitted as a reply packet (S48).

Communication termination indication from the high-level protocol is read (S49). To terminate the communications (S50), the slave 12*b* makes a transition from the communication state to the communication link control state (S51). To continue the communications, control returns to step S41 and the operation flow is repeated.

(Operation Flow of Master)

Figure 10:
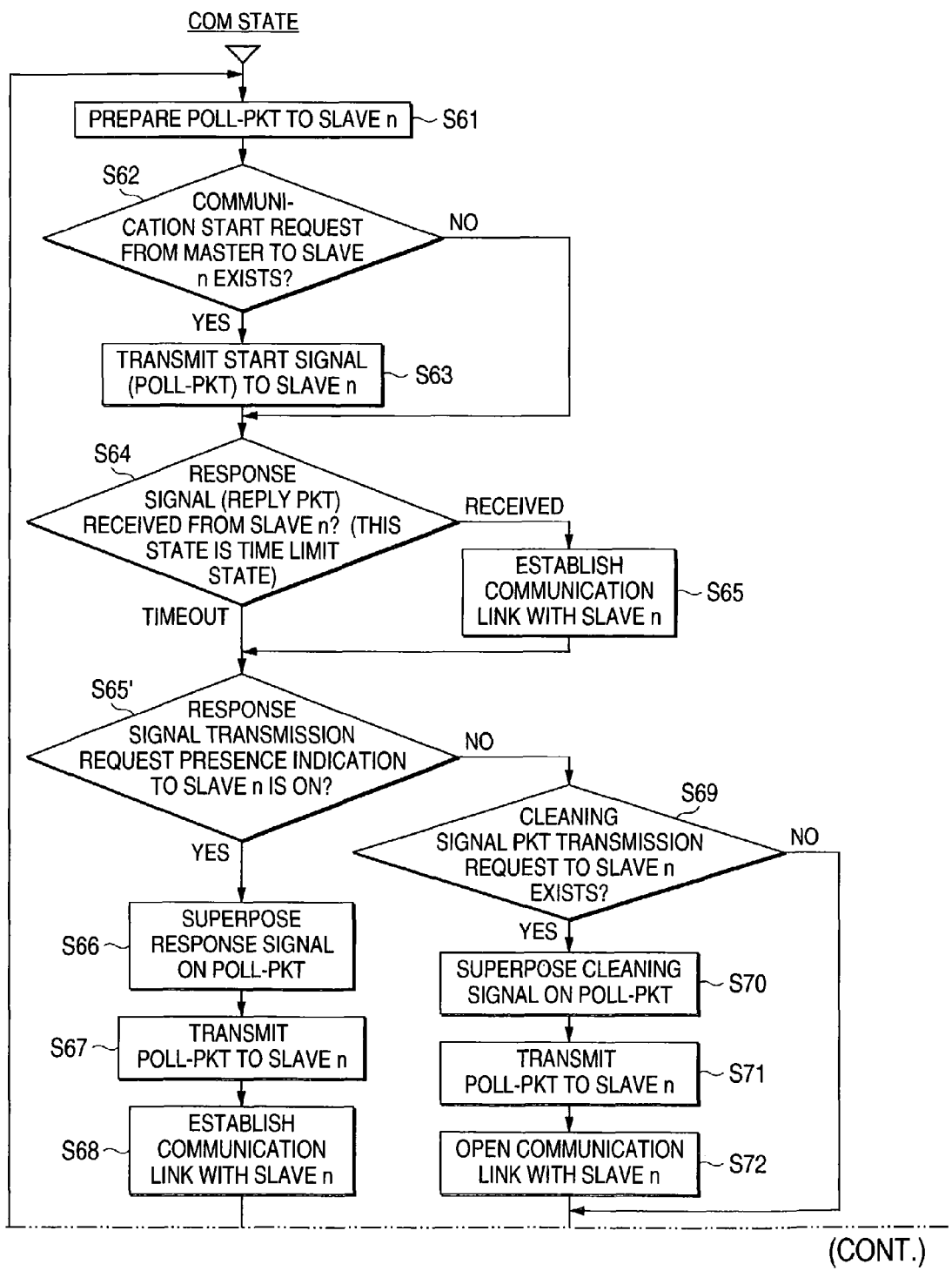
FIG. 10 is a flowchart showing an operation flow of the master in the communication state using the scheme in FIG. 3 in the communication system in FIG. 1.

FIG. 10 shows an operation flow of the master 12*a* in the communication state. This operation flow corresponds to the scheme previously described with reference to FIG. 3. It basically is executed by the CPU 22 functioning as a communication control section for executing a communication packet transmission/reception program stored in the memory 23. Steps 63, 67, 75 and 71 in FIG. 10 are executed by the radio communication section 21.

First, a polling packet to slave n (slave n is any of the slaves 1 to 3 in FIG. 3) is prepared (S61) and whether or not a communication start request to be sent from the master 12*a* to the slave n exists is determined (S62). If a communication start request exists, a start signal as the polling packet is transmitted (S63). The master 12*a* waits for reception of a response signal from the slave n as a time limit state (S64). Upon reception of a response signal, the master 12*a* establishes a communication link with the slave n (S65).

Whether or not a start signal was previously received from the slave n and a response signal needs to be sent to the slave n is determined by referencing response signal transmission request presence indication stored in the memory 23 (S65'). If a response signal needs to be sent, the response signal is superposed on polling packet (S66), the polling packet is sent to the slave n (S67), and the master 12*a* establishes a communication link with the slave n (S68) If it is determined at step S65' that a response signal need not be sent to the slave n, whether or not a clearing signal needs to be transmitted to the slave n is determined (S69). If a clearing signal needs to be transmitted, the clearing signal is superposed on polling packet (S70), the polling packet is sent to the slave n (S71) and the master 12*a* opens the communication link with the slave n (S72).

If it is determined at step S69 that a clearing signal need not be transmitted to the slave n, whether or not a communication packet transmission request to the slave n exists is checked (S73). A communication packet from the high-level protocol is superposed on polling packet (S74) and the polling packet is transmitted (S75).

After step S68 or S75, the master 12*a* waits for reception of a reply packet from the slave n as a time limit state (S76).

When a timeout occurs, the master 12*a* polls the next slave n+1 (S77) and determines whether or not polling of all slaves terminates in the polling period (S84). If polling of all slaves does not terminate, control returns to step S61 and the operation flow is repeated; if polling of all slaves terminates, the master 12*a* enters a start wait state until the next polling period of the slave n. (S85).

If a reply packet from the slave n is received at step S76, whether or not the reply packet is a clearing signal is determined (S78), whether or not the reply packet is a communication packet is determined (S80), and whether or not the reply packet is a start signal is determined (S82). If the reply packet is a clearing signal, the communication link with the slave n is opened (S79). If the reply packet is a communication packet, the communication packet is transferred to the high-level protocol (S81). If the reply packet is a start signal, the response signal transmission request presence indication stored in the memory 23, referenced at step S65 is set to ON (presence) (S83). Then, control goes to step S77.

Figure 11:
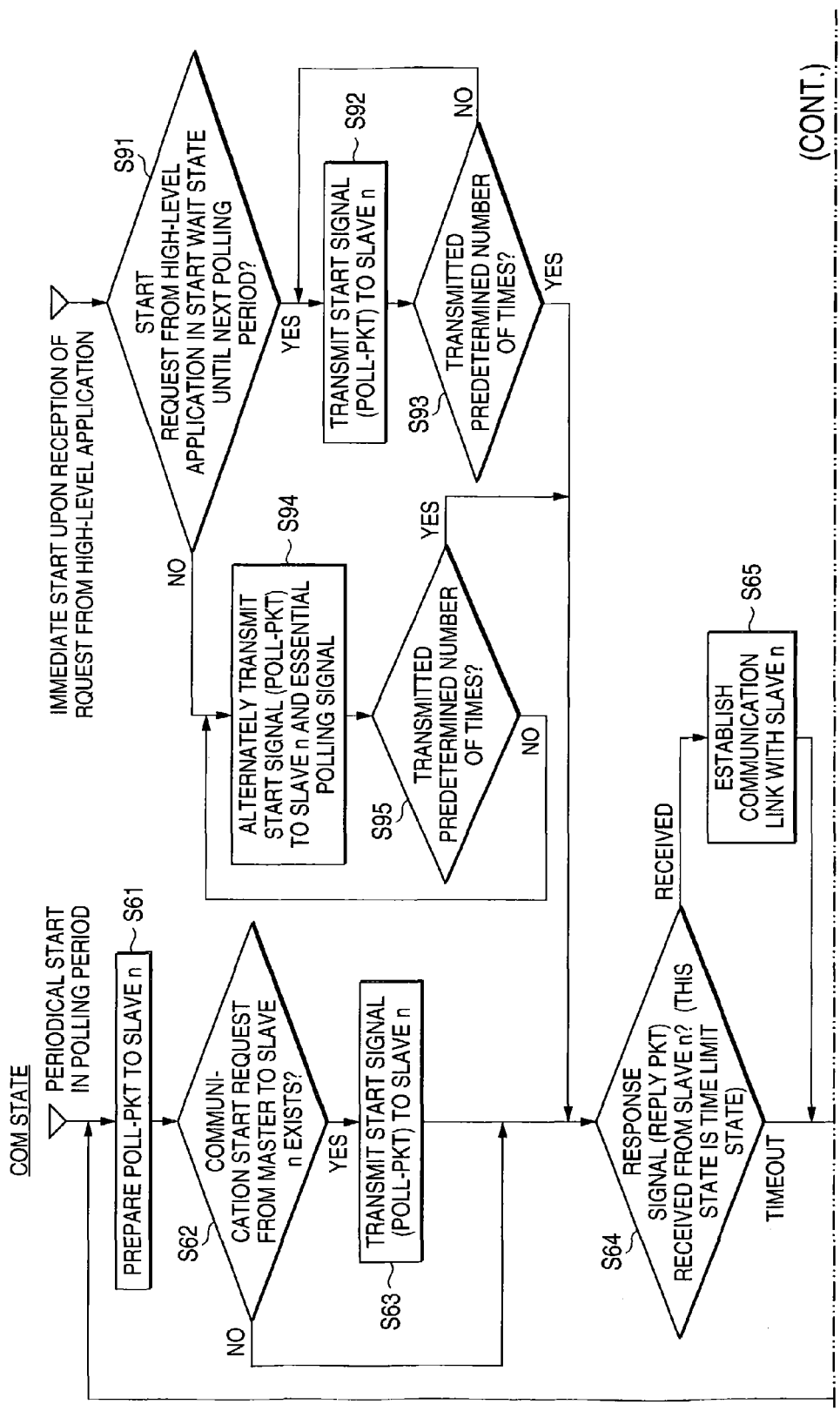
FIG. 11 is a flowchart showing an operation flow of the master in the communication state using the scheme in FIG. 5 in the communication system in FIG. 1.

FIG. 11 shows an operation flow of the master 12*a* in the communication state corresponding to the scheme previously described with reference to FIG. 5. The operation flow basically is also executed by the CPU 22 functioning as the communication control section for executing the communication packet transmission/reception program stored in the memory 23. Steps 63, 67, 92 and 94 in FIG. 11 are executed by the radio communication section 21.

In the operation flow, basically the same processing as in FIG. 10 is performed and steps S91 to S95 in FIG. 11 are added. Some of the steps previously described with reference to FIG. 10 are denoted by the same numerals in FIG. 11 to show the relationship between steps S91 to S95 and the steps in FIG. 10.

In the operation flow, steps S91 to S95 are executed in response to a request made by the high-level protocol. When a request is made by the high-level protocol, first the requested time is in the start wait state until the next polling period is determined (S91). If the time is in the start wait state, a start signal is transmitted to the slave n (S92) and the transmission of the start signal is repeated a predetermined number of times (S93) and then control goes to step S65.

If the request time is not in the start wait state until the next polling period at step S91, a start signal to the slave n and a polling signal to be transmitted essentially at the time by the master 12*a* are transmitted alternately (S94) and the transmission is repeated a predetermined number of times (S95) and then control goes to step S65.

The master 12*a* always keeps track of the slaves 1 to 3 as to whether or not the slaves 1 to 3 are in the communication state. Thus, the master 12*a* manages a management table stored in the memory 23 indicating whether or not each of the slaves 1 to 3 is in the communication state. The management table is a table updated dynamically; when a communication link with the slave n is established, the table entry corresponding to the slave n is set to ON (communication state) and when the communication link is opened, the table entry corresponding to the slave n is set to OFF (non-communication state).

As described above, the communication link is established or opened by a stimulus from the high-level protocol using the communication system 12. That is, communication link setting or opening is started by a stimulus from the high-level protocol (request operation). Specifically, when the master 12*a* starts the slave 12*b*, the communication link is established when the master 12*a* receives a response signal from the slave 12*b*; when the slave 12*b* starts the master 12a, the communication link is established when the master 12a transmits a response signal to the slave 12b. When the master 12a transmits a clearing signal to the slave 12b or when the master 12a receives a clearing signal from the slave 12b, the communication link is opened.

As described above, the communication system 12 is a fully wireless communication system which includes a local area radio network made up of the slaves and the master for enabling the slaves or the master to start communications and can be used continuously for many hours. Therefore, the communication system 12 can be preferably used with various monitoring systems requiring continuous monitoring for many hours.

As described above, in the communication system according to first aspect of the present invention, the slave can take any of the start state in which the slave can communicate with the master, the communication control state in which at least the slave can receive a start request signal transmitted by the master and makes a transition to the start state upon reception of the start request signal, or the standby state in which power is less consumed than in the start state or the communication control state. The slave further includes the state control section for repeatedly operating so that the slave in the standby state is switched to the communication control state at a predetermined timing and is switched to the standby state when the communication control state continues for a predetermined time period without receiving the start request signal.

In the described configuration, when communications between the slave and the master are not conducted, basically the slave can be placed in the standby mode for decreasing power consumption. The slave, which is in the standby state, is switched to the communication control state, for example, in a predetermined period under the control of the state control section and can monitor a start request sent from the master. Thus, if it becomes necessary for the master to communicate with the slave, the master can also transmit a start request signal at an independent timing of the slave for causing the slave to switch to the start state for conducting communications therebetween.

Therefore, according to the described configuration, the communication system that can start the slave in response to a start request made by the master while decreasing power consumption in the slave can be provided.

As the communication system according to the second aspect of the present invention, in the communication system of the first aspect of the present invention, communications between the master and the slave may be radio communications, the first communication section may transmit the start request signal by radio communications, and the second communication section may receive the start request signal by radio communications.

In the described configuration, a communication system wherein a fully wireless slave to which neither a communication line nor a power supply line is connected can be operated can be provided.

As the communication system according to the third aspect of the present invention, the communication system of the first or second aspect of the present invention may include a plurality of the slaves, wherein the master may switch assignment time periods of communications with the slaves in order, thereby communicating with the slaves, and the master transmits the start request signal, the master may transmit the start request signal in the assignment time period of communications with the slave to which the start request signal is transmitted.

In the described configuration, the master switches the assignment time periods of communications with the slaves in order, thereby communicating with the slaves as in polling processing started by the master, for example. The master can transmit the start request signal in the assignment time period of communications with the target slave as a part of polling processing, for example.

As the communication system according to the fourth aspect of the present invention, the communication system of the first or second aspect of the present invention may include a plurality of the slaves, wherein the master may switch assignment time periods of communications with the slaves in order, thereby communicating with the slaves, and the master transmits the start request signal, the master may transmit the start request signal using a time period between the assignment time periods of communications with the slaves.

In the described configuration, the master transmits the start request signal using the time period between the assignment time periods of communications with the slaves. Accordingly, if the number of slaves grows, enlarging of the start request signal transmission timing interval can be suppressed.

Consequently, while the time period of the communication control state in the slave is set to a shorter time period, the slave can receive the start request signal promptly and can respond to a start request from the mater promptly.

As the communication system according to the fifth aspect of the present invention, in the communication system of the fourth aspect of the present invention, the start request signal may be a signal that can cause two or more slaves to make a transition from the communication control state to the start state.

In the described configuration, when the master causes the two or more slaves to make a transition to the start state, it can cause the two or more slaves to make a transition to the start state by a common start request signal.

As the communication system according to the sixth aspect of the present invention, in the communication system of the fourth or fifth aspect of the present invention, preferably the time period between the state control section of each slave switching the slave to the communication control state and then switching the slave to the standby state is a time period that can include one of assignment time periods to the slaves in the master and the time required for the master to transmit the start request signal.

In the described configuration, when the slave makes a transition to the communication control state, if the master is in the assignment time period with each slave, the slave is still in the communication control state when the assignment time period terminates and a start signal is transmitted. Therefore, failing to receive a start request signal in the slave can be circumvented and the slave can be started reliably in response to a start request made by the master.

As the communication system according to the seventh aspect of the-present invention, in the communication system of the fourth or fifth aspect of the present invention, when the master transmits the start request signal, preferably the master repeatedly transmits the start request signal for a longer time than the time required until, after the state control section of one of the slaves switches the slave to the communication control state, the state control section switches the slave to the standby state and further to the communication control state.

In the described configuration, when the slave makes a transition to the communication control state first after the master starts to transmit the start request signal, the master still repeats transmission of the start request signal. Accordingly, when the slave makes a transition to the communication control state first after the master starts to transmit the start request signal, it is made possible for the slave to make a transition to the start state. Therefore, if the master makes a start request, it is made possible to cause the slave to make a transition to the start state as quickly as possible.

The communication apparatus according to the eighth aspect of the present invention can take any of a start state in which the communication apparatus can communicate with the master, a communication control state in which at least the communication apparatus can receive a start request signal transmitted by the master and makes a transition to the start state upon reception of the start request signal, or a standby state in which power is less consumed than in the start state or the communication control state. The communication apparatus further includes a state control section for repeatedly operating so that the communication apparatus in the standby state is switched to the communication control state at a predetermined timing and is switched to the standby state when the communication control state continues for a predetermined time period without receiving the start request signal.

The communication apparatus can be used as the slave in the communication system, so that the communication system that can start the slave in response to a start request made by the master while decreasing power consumption in the slave can be provided.

The communication control method according to the ninth aspect of the present invention is a communication control method in a slave that can communicate with a master, wherein the slave can take any of a start state in which the slave can communicate with the master, a communication control state in which at least the slave can receive a start request signal transmitted by the master and makes a transition to the start state upon reception of the start request signal, or a standby state in which power is less consumed than in the start state or the communication control state. The operation of switching from the standby state to the communication control state at a predetermined timing and switching to the standby state when the communication control state continues for a predetermined time period without receiving the start request signal are performed repeatedly.

The communication control method can be used as control of the slave in the communication system, so that the communication system that can start the slave in response to a start request made by the master while decreasing power consumption in the slave can be provided.

What is claimed is:

1. A communication system comprising:
a master and a slave that can communicate with each other, said master including a first communication section for transmitting a start request signal to said slave, said slave including a second communication section for receiving the start request signal transmitted by said master,
wherein said slave can take any of
a start state in which said slave can communicate with said master,
a communication control state in which at least said slave can receive the start request signal transmitted by said master and makes a transition to the start state upon reception of the start request signal, or
a standby state in which power is less consumed than in the start state or the communication control state,
wherein said slave further comprises a state control section for repeatedly operating so that said slave in the standby state is switched, independently of any signal from the master, to the communication control state at a predetermined timing and is switched to the standby state when the communication control state continues for a predetermined time period without receiving the start request signal, and
wherein said slave further comprises a sensor communicating section which produces a communication state request so that the slave in the standby state is switched to the communication control state.

2. The communication system as claimed in claim 1, wherein communications between said master and said slave are radio communications, the first communication section transmits the start request signal by radio communications, and the second communication section receives the start request signal by radio communications.

3. The communication system as claimed in claim 2, comprising a plurality of said slaves,
wherein said master switches assignment time periods of communications with said slaves in order, thereby communicating with said slaves, and when said master transmits the start request signal, said master transmits the start request signal in the assignment time period of communications with the slave to which the start request signal is transmitted.

4. The communication system as claimed in claim 2, comprising a plurality of said slaves,
wherein said master switches assignment time periods of communications with said slaves in order, thereby communicating with said slaves, and when said master transmits the start request signal, said master transmits the start request signal using a time period between the assignment time periods of communications with said slaves.

5. The communication system as claimed in claim 4, wherein the start request signal is a signal that can cause two or more slaves to make a transition from the communication control state to the start state.

6. The communication system as claimed in claim 4, wherein the time period between the state control section of each slave switching said slave to the communication control state and then switching said slave to the standby state is a time period that can include one of assignment time periods to said slaves in said master and the time required for said master to transmit the start request signal.

7. The communication system as claimed in claim 4, wherein said master transmits the start request signal, said master repeatedly transmits the start request signal for a longer time than the time required until, after the state control section of one of said slaves switches said slave to the communication control state, the state control section switches said slave to the standby state and further to the communication control state.

8. The communication system as claimed in claim 1, comprising a plurality of said slaves,
wherein said master switches assignment time periods of communications with said slaves in order, thereby communicating with said slaves, and when said master transmits the start request signal, said master transmits the start request signal in the assignment time period of communications with the slave to which the start request signal is transmitted.

9. The communication system as claimed in claim 1, comprising a plurality of said slaves, wherein said master switches assignment time periods of communications with said slaves in order, thereby communicating with said slaves, and when said master transmits the start request signal, said master transmits the start request signal using a time period between the assignment time periods of communications with said slaves.

10. The communication system as claimed in claim 9, wherein the start request signal is a signal that can cause two or more slaves to make a transition from the communication control state to the start state.

11. The communication system as claimed in claim 9, wherein the time period between the state control section of each slave switching said slave to the communication control state and then switching said slave to the standby state is a time period that can include one of assignment time periods to said slaves in said master and the time required for said master to transmit the start request signal.

12. The communication system as claimed in claim 9, wherein said master transmits the start request signal, said master repeatedly transmits the start request signal for a longer time than the time required until, after the state control section of one of said slaves switches said slave to the communication control state, the state control section switches said slave to the standby state and further to the communication control state.

13. The communication system as claimed in claim 1, wherein the slave further comprises a timer, wherein the timer performs a count operation to switch the stave from the standby state to the communication control state at the predetermined timing, and to switch the slave from the communication control state to the standby state after a predetermined time period.

14. A communication apparatus as a slave that can communicate with a master, comprising:
  a communication section, when the master transmits a start request signal to said communication apparatus, for receiving the start request signal,
  wherein said communication apparatus can take any of a start state in which said communication apparatus can communicate with the master, a communication control state in which at least said communication apparatus can receive the start request signal transmitted by the master and makes a transition to the start state upon reception of the start request signal, or a standby state in which power is less consumed than in the start state or the communication control state,
  wherein said communication apparatus further comprises a state control section for repeatedly operating so that, independently of any signal from the master, said communication apparatus in the standby state is switched to the communication control state at a predetermined timing and is switched to the standby state when the communication control state continues for a predetermined time period without receiving the start request signal, and wherein said slave further comprises a sensor communicating section which produces a communication state request so that the slave in the standby state is switched to the communication control state.

15. The communication apparatus as claimed in claim 14, wherein the communication section receives the start request signal by radio communications.

16. The communication apparatus as claimed in claim 14, wherein the slave further comprises a timer, wherein the timer performs a count operation to switch the slave from the standby state to the communication control state at the predetermined timing, and to switch the slave from the communication control state to the standby state after a predetermined time period.

17. The communication control method as claimed in claim 14, wherein the standby state has a duration which is shorter that a period for which the master transmits the start request signal.

18. A communication control method in a slave that can communicate with a master, the method comprising:
  inducing a start state in the slave in which the slave can communicate with the master;
  inducing a communication control state in the slave in which at least the slave can receive a start request signal transmitted by the master and makes a transition to the start state upon reception of the start request signal;
  inducing a standby state in the slave wherein less power is consumed than in the start state or the communication control state;
  independently of any signal from the master, performing repeatedly an operation of switching from the standby state to the communication control state at a predetermined timing and switching to the standby state when the communication control state continues for a predetermined time period without receiving the start request signal, and
  using a sensor communicating section to produce a communication state request so that the slave in the standby state is switched to the communication control state.

19. The communication control method as claimed in claim 18, wherein the slave receives the start request signal by radio communications.

20. The communication control method as claimed in claim 18, wherein the slave further comprises a timer, wherein the timer performs a count operation to switch the slave from the standby state to the communication control state at the predetermined timing, and to switch the slave from the communication control state to the standby state after a predetermined time period.

* * * * *